3,143,549
PHENYLALKYLSULFAMIDES
John J. Lafferty, Levittown, and Bernard Loev, Broomall,
Pa., assignors to Smith Kline & French Laboratories,
Philadelphia, Pa., a corporation of Pennsylvania
No Drawing. Filed Sept. 14, 1962, Ser. No. 223,826
7 Claims. (Cl. 260—268)

This invention relates to new phenylalkylsulfamides having pharmacodynamic activity. More specifically, the phenylalkylsulfamides of this invention have central nervous system activity and in particular have anti-anxiety and tranquilizing properties.

The novel phenylalkylsulfamides of this invention are represented by the following structural formula:

FORMULA I

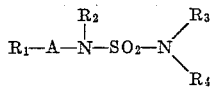

when:
A represents lower alkylene having 2 to 5 carbon atoms inclusive;
$R_1$ represents phenyl, halophenyl, trifluoromethylphenyl, lower alkylphenyl, lower alkoxyphenyl, aminophenyl, hydroxyphenyl, dihalophenyl, di-lower alkylphenyl, di-lower alkoxyphenyl or methylenedioxyphenyl;
$R_2$ represents hydrogen or lower alkyl and
$R_3$ and $R_4$ represent hydrogen, lower alkyl or, when taken together with the nitrogen atom to which they are attached, N-pyrrolidinyl, N-piperidyl, N-piperazinyl, N'-lower alkyl-N-piperazinyl or N'-hydroxy-lower alkylene-N-piperazinyl.

Preferred compounds of this invention have the following formula:

FORMULA II

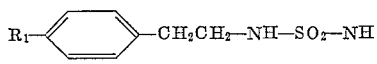

in which $R_1$ represents hydrogen, chloro or trifluoromethyl.

A preferred compound of this invention is phenethylsulfamide which has the advantageous property of relieving anxiety without decreasing motor activity or producing strong depressant effects.

By the terms "lower alkyl" and "lower alkoxy" where used herein groups having from 1 to 6, preferably 1 to 2, carbon atoms are indicated. The term "halo" where used herein denotes halogen moieties having an atomic weight of less than 80. The term "lower alkylene" denotes groups having 2–5 carbon atoms, preferably 2.

The novel phenylalkylsulfamides of this invention are prepared by the following procedures:

(I)
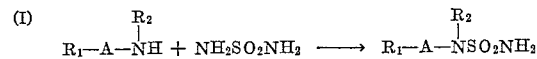

The terms A, $R_1$ and $R_2$ are as defined above.

(II)
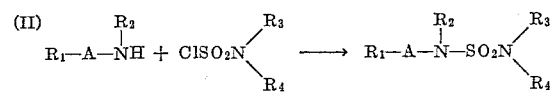

The terms A, $R_1$ and $R_2$ are as defined above; $R_3$ and $R_4$ are lower alkyl.

According to Procedure I a phenylalkylsulfamide of Formula I in which $R_3$ and $R_4$ are hydrogen is prepared by reacting a phenylalkylamine with sulfamide. Preferably an excess of the sulfamide, such as about a 10% excess, is used. The reaction is carried out in a solvent in which the reactants are substantially soluble, for example in water, at about 60–100° C. for about 2–6 hours.

By Procedure II, the N',N'-di-lower alkyl-N-phenylalkylsulfamides of this invention are prepared by reacting a phenylalkylamine with di-lower alkylsulfamoyl chloride. The reaction is carried out in an inert solvent such as an aromatic hydrocarbon, for example benzene or toluene, conveniently at room temperature for about 1–20 hours, preferably about 2–4 hours. Advantageously two moles of the phenylalkylamine are present for each mole of the sulfamoyl chloride derivative in the reaction mixture.

The N'-mono-lower alkyl-N-phenylalkylsulfamides of this invention are prepared by treating the N-phenylalkylsulfamide with one equivalent of an alkylating agent such as a lower alkyl halide, for example a lower alkyl bromide or iodide or a di-lower alkyl sulfate, such as dimethylsulfate, conveniently at room temperature for about 1–4 hours, preferably about 3 hours.

The compounds of Formula I in which $R_3$ and $R_4$ are hydrogen, lower alkyl or, when taken together, N-pyrrolidinyl, N-piperidyl, N-piperazinyl, N'-lower alkyl-N-piperazinyl or N'-hydroxyl-lower alkylene-N-piperazinyl are prepared by reacting at about 40–65° C. An N-acyl-N-chlorosulfonylphenylalkylamine (prepared by reacting an N-acyl-phenylalkylamine with sodium followed by sulfuryl chloride) with ammonia or the appropriate lower alkylamine or cyclic amine such as pyrrolidine, piperidine, etc. in an anhydrous solvent such as ether, benzene or toluene. To prepare the N'-hydroxy-lower alkylene-N-piperazinyl compounds the N-acyl-N-chlorosulfonylphenylalkylamine is reacted with an N-acyloxypiperazine with hydrolysis of the resulting N'-acyloxy-lower alkylene-N-phenylalkylsulfamoylpiperazine.

The phenylalkylsulfamides of this invention are preferably employed in pharmaceutical form in admixture with a pharmaceutical carrier. The pharmaceutical carrier may be either a solid or a liquid. Exemplary of solid carriers are lactose, magnesium stearate, terra alba, sucrose, talc, stearic acid, gelatin, agar, pectin, and acacia. Exemplary of liquid carriers are peanut oil, olive oil, sesame oil and water. Similarly, the carrier or diluent may include a time delay material such as glyceryl monostearate or glyceryl distearate alone or with a wax.

A wide variety of pharmaceutical forms can be used. Thus if a solid carrier is used the preparation can be in the form of a tablet, a pharmaceutical powder, a hard gelatin capsule, a troche or a lozenge. If a liquid carrier is used, the preparation can be in the form of a soft gelatin capsule or may be placed in an ampule or in a liquid suspension.

A dosage unit for internal administration comprises from about 5 mg. to about 150 mg., preferably from about 10 mg. to about 100 mg. of active ingredient.

The administration may be parenterally or orally. Advantageously equal doses will be administered from one to four times daily. The daily dosage regimen will be from about 20 mg. to about 250 mg., preferably from about 50 mg. to about 200 mg. per day.

The following examples are not limiting but are illustrative of this invention.

*Example 1*

A mixture of 24.2 g. of phenethylamine, 21.1 of sulfamide and 300 ml. of water is heated on a steam bath at about 90–95° C. for four hours. The resulting mixture is extracted with ether. The ethereal extract is washed with dilute hydrochloric acid and then extracted with 5% sodium hydroxide. Adding dilute hydrochloric acid to the basic extract precipitates the product which is recrystallized from ether-hexane to give phenethylsulfamide.

Example 2

Fifteen grams of 4-chlorophenethylamine and 10.6 g. of sulfamide in 200 ml. of water are heated at 85–90° C. for 3.5 hours. Working up as in Example 1 gives 4-chlorophenethylsulfamide.

Example 3

A mixture of 13.5 g. of 3-phenylpropylamine and 10.6 g. of sulfamide in 150 ml. of water is heated at 80–90° C. for four hours to give, after working up as in Example 1, 3-phenylpropylsulfamide.

Similarly reacting 2-phenylpropylamine, 4-phenylbutylamine and 5-phenylpentylamine with sulfamide gives 2-phenylpropylsulfamide, 4-phenylbutylsulfamide and 5-phenylpentylsulfamide, respectively.

Example 4

A mixture of 7.7 g. of 2-chlorophenethylamine and 5.3 g. of sulfamide in 100 ml. of water is heated on a steam bath for three hours to give, after working up as in Example 1, 2-chlorophenethylsulfamide.

Example 5

By the procedure of Example 1, 3-chlorophenethylamine is reacted with sulfamide in aqueous solution to give 3-chlorophenethylsulfamide.

Similarly reacting 4-bromophenethylamine and 4-fluorophenethylamine with sulfamide in aqueous solution furnishes 4-bromophenethylsulfamide and 4-fluorophenethylsulfamide, respectively.

Example 6

Twenty-five grams of 3-methylphenethylamine and 10.3 g. of sulfamide in 300 ml. of water are heated at 90° C. for four hours. The mixture is extracted with ether and the extract is washed with dilute hydrochloric acid, then extracted with dilute aqueous sodium hydroxide solution. The basic extract is acidified and the precipitate is filtered off and recrystallized from ether-hexane to give 3-methylphenethylsulfamide.

Example 7

A mixture of 18.9 g. of 4-trifluoromethylphenethylamine (prepared by reducing 4-trifluoromethyl benzoic acid with lithium aluminum hydride in ether, treating the resulting 4-trifluoromethylbenzyl alcohol with hydrobromic acid, then with sodium cyanide and hydrogenating the resulting cyano compound to give the 4-trifluoromethylphenethylamine) and 10.5 g. of sulfamide in water is heated on a steam bath for 3.5 hours to give, after working up as in Example 1, 4-trifluoromethylphenethylsulfamide.

Example 8

To 16.0 g. of N-methylphenethylamine in 40 ml. of dry benzene, 8.4 g. of dimethylsulfamoyl chloride in 10 ml. of benzene is added at 10° C. The resulting mixture is stirred at 25° C. for 16 hours. Ethereal hydrogen chloride and ether are added. The mixture is cooled and filtered. The filtrate is washed with water, dried, concentrated and distilled to give N-phenethyl-N,N′,N′-trimethylsulfamide.

Example 9

To 14.4 g. of phenethylamine in 40 ml. of dry benzene is added 8.4 g. of dimethylsulfamoyl chloride in 10 ml. of dry benzene at 10° C. The mixture is stirred at room temperture for three hours, then is worked up as in Example 8 to give N-phenyl-N′,N′-dimethylsulfamide.

Example 10

By the procedure of Example 1, 13.5 g. of N-methylphenethylamine and 10.5 g. of sulfamide in 150 ml. of water is heated at 90–95° C. to give, after working up, N-methyl-N-phenethylsulfamide.

Example 11

A mixture of 10.7 g. of N-methyl-N-phenethylsulfamide, prepared as in Example 10 and 5.0 g. of sodium hydroxide in aqueous solution is treated with 6.3 g. of dimethylsulfate. The mixture is stirred at room temperature for three hours. Extracting with ether, washing the extract with water, drying, concentrating and distilling gives N-phenethyl-N,N′-dimethylsulfamide.

Example 12

By the procedure of Example 11, 10.0 g. of phenethylsulfamide, prepared as in Example 1, in aqueous sodium hydroxide is reacted with 6.3 g. of dimethylsulfate at room temperature to give N′-methyl-N-phenethylsulfamide.

Example 13

A mixture of 14.9 g. of N-ethylphenethylamine and 10.5 g. of sulfamide in water is heated on a steam bath for four hours to give, after working up as in Example 1, N-ethyl-N-phenethylsulfamide.

Example 14

A mixture of 11.4 g. of N-ethyl-N-phenethylsulfamide, prepared as in Example 13, and 5.4 g. of ethyl bromide in 100 ml. of benzene containing 4.0 g. of potassium carbonate is heated at reflux for 30 minutes. The reaction mixture is poured into water. The organic layer is separated, dried, concentrated and distilled to give N-phenethyl-N,N′-diethylsulfamide.

Example 15

By the procedure of Example 1, 19.1 g. of 2,4-dichlorophenethylamine and 10.6 g. of sulfamide are reacted in aqueous solution and worked up to give 2,4-dichlorophenethylsulfamide.

Similarly using, in place of 2,4-dichlorophenethylamine, 3,4 - dichlorophenethylamine, 2,4-dimethylphenethylamine, 3,4-dimethoxyphenethylamine and 3,4-methylenedioxyphenethylamine gives the following products, 3,4 - dichlorophenethylsulfamide, 2,4-dimethylphenethylsulfamide, 3,4 - dimethoxyphenethylsulfamide and 3,4-methylenedioxyphenethylsulfamide, respectively.

Example 16

An anhydrous benzene solution of N-acetyl-phenethylamine is heated at reflux with sodium until a suspension is formed. To this suspension is added sulfuryl chloride in benzene. The resulting mixture is filtered and the filtrate is evaporated to dryness to give N-acetyl-N-chlorosulfonyl-phenethylamine.

A mixture of 13.0 g. of N-acetyl-N-chlorosulfonyl-phenethylamine and 7.1 g. of pyrrolidine in 100 ml. of anhydrous benzene is heated at 50° C. for four hours, then cooled and filtered. The filtrate is treated with dilute hydrochloric acid. The organic layer is extracted with dilute sodium hydroxide solution. The alkaline solution is acidified and the precipitate is filtered and recrystallized from ether-hexane to give N-phenethylsulfamoylpyrrolidine.

Similarly reacting piperidine, piperazine and N-methylpiperazine with N - acetyl - N - chlorosulfonyl-phenethylamine gives N-phenethylsulfamoylpiperidine, N-phenethylsulfamoylpiperazine and N′-methyl - N - phenethylsulfamoylpiperazine.

By the same procedure N-acetoxyethylpiperazine is reacted with N-acetyl-N-chlorosulfonyl-phenethylamine to give after hydrolysis with aqueous base, N′-hydroxyethyl-N-phenethylsulfamoylpiperazine.

Example 17

| Ingredients: | Amounts, mg. |
|---|---|
| Phenethylsulfamide | 50 |
| Sucrose | 200 |
| Starch | 25 |
| Talc | 5 |
| Stearic acid | 2 |

The active ingredient and the sucrose are mixed and granulated with 10% gelatin solution. The weted mass is passed through a #6 U.S. mesh screen directly onto drying trays. The granules are dried and passed through a #20 U.S. mesh screen. These granules are then mixed with the starch, talc and stearic acid, passed through a #60 U.S. mesh screen and then compressed into tablets.

*Example 18*

| Ingredients: | Amounts, mg. |
|---|---|
| 4-chlorophenethylsulfamide | 100 |
| Lactose | 200 |

The ingredients are mixed and filled into a hard gelatin capsule.

*Example 19*

| Ingredients: | Amounts, mg. |
|---|---|
| Phenethylsulfamide | 25 |
| Peanut oil | 150 |

The ingredients are mixed into a slurry and filled into a soft gelatin capsule.

What is claimed is:
1. A compound of the formula:

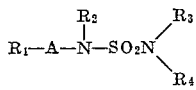

in which:
A is lower alkylene having 2 to 5 carbon atoms inclusive;
$R_1$ is a member selected from the group consisting of phenyl, halophenyl, trifluoromethylphenyl, lower alkylphenyl, lower alkoxyphenyl, aminophenyl, hydroxyphenyl, dihalophenyl, di-lower alkylphenyl, di-lower alkoxyphenyl and methylenedioxyphenyl;
$R_2$ is a member selected from the group consisting of hydrogen and lower alkyl;
$R_3$ and $R_4$ are members selected from the group consisting of hydrogen, lower alkyl and, when taken together with the nitrogen atom to which they are attached, N-pyrrolidinyl, N-piperidyl, N-piperazinyl, N'-lower alkyl-N-piperazinyl and N'-hydroxy-lower alkylene-N-piperazinyl.

2. A compound of the formula:

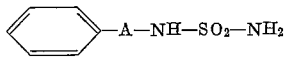

in which A is lower alkylene having 2 to 5 carbon atoms.

3. A compound of the formula:

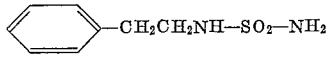

4. A compound of the formula:

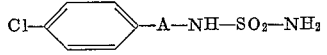

in which A is lower alkylene having 2 to 5 carbon atoms.

5. A compound of the formula:

6. A compound of the formula:

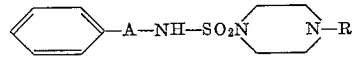

in which:
A is lower alkylene having 2 to 5 carbon atoms inclusive and
R is lower alkyl.

7. A compound of the formula:

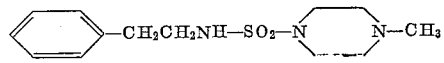

References Cited in the file of this patent

UNITED STATES PATENTS

| 2,829,038 | Ochsner | Apr. 1, 1958 |
| 2,867,658 | Frick | Jan. 6, 1959 |
| 3,041,336 | Teufel | June 26, 1962 |
| 3,068,283 | Kaiser et al. | Dec. 11, 1962 |

FOREIGN PATENTS

| 947,554 | Germany | Aug. 16, 1956 |
| 789,273 | Great Britain | Jan. 15, 1958 |

OTHER REFERENCES

Vandi et al.: Journal Organic Chemistry, vol. 26, No. 4, pages 1136–1138 (1961).